US010325503B2

(12) United States Patent
Servantie et al.

(10) Patent No.: US 10,325,503 B2
(45) Date of Patent: Jun. 18, 2019

(54) METHOD OF VISUALIZATION OF THE TRAFFIC AROUND A REFERENCE AIRCRAFT IN A COMPLIANT DISPLAY ZONE, ASSOCIATED COMPUTER PRODUCT PROGRAM AND VISUALIZATION SYSTEM

(71) Applicant: THALES, Courbevoie (FR)

(72) Inventors: Xavier Servantie, Merignac (FR); Florent Mennechet, Merignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/960,459

(22) Filed: Apr. 23, 2018

(65) Prior Publication Data

US 2018/0315322 A1 Nov. 1, 2018

(30) Foreign Application Priority Data

Apr. 26, 2017 (FR) ...................... 17 00456

(51) Int. Cl.
| | |
|---|---|
| *G08G 5/00* | (2006.01) |
| *B64D 43/00* | (2006.01) |
| *G08G 5/04* | (2006.01) |
| *G01C 23/00* | (2006.01) |
| *G02B 27/01* | (2006.01) |

(52) U.S. Cl.
CPC .......... *G08G 5/0021* (2013.01); *B64D 43/00* (2013.01); *G01C 23/005* (2013.01); *G08G 5/0052* (2013.01); *G08G 5/0078* (2013.01); *G08G 5/04* (2013.01); *G08G 5/045* (2013.01); *G02B 27/0101* (2013.01); *G02B 2027/0141* (2013.01); *G08G 5/0069* (2013.01)

(58) Field of Classification Search
CPC combination set(s) only.
See application file for complete search history.

(56) References Cited

U.S. PATENT DOCUMENTS

| | | | |
|---|---|---|---|
| 8,362,925 B2* | 1/2013 | Brinkman | G01C 23/00 340/945 |
| 8,849,477 B2* | 9/2014 | Brinkman | G01C 25/00 701/14 |
| 2009/0265088 A1 | 10/2009 | Dias | |
| 2010/0094487 A1* | 4/2010 | Brinkman | G01C 23/00 701/14 |

FOREIGN PATENT DOCUMENTS

| | | |
|---|---|---|
| EP | 2161196 A1 | 3/2010 |
| EP | 2249126 A2 | 11/2010 |

OTHER PUBLICATIONS

French Patent Application 17 00456, Rapport de Recherche Preliminaire, Dec. 18, 2017, 2 pages.

* cited by examiner

*Primary Examiner* — Travis R Hunnings
(74) *Attorney, Agent, or Firm* — Soquel Group LLC

(57) ABSTRACT

A method of visualization of the traffic around a reference aircraft including acquiring the actual position of a surrounding aircraft, delimiting part of the airspace around this position by a current three-dimensional contour, visualizing the current three-dimensional contour, tracking the actual position of the surrounding aircraft, and when this position is outside the current three-dimensional contour: delimiting part of the airspace around the actual position of the surrounding aircraft by a new current three-dimensional contour, and visualizing the current three-dimensional contour.

15 Claims, 2 Drawing Sheets

METHOD OF VISUALIZATION OF THE TRAFFIC AROUND A REFERENCE AIRCRAFT IN A COMPLIANT DISPLAY ZONE, ASSOCIATED COMPUTER PRODUCT PROGRAM AND VISUALIZATION SYSTEM

CROSS REFERENCE TO RELATED APPLICATIONS

This application claims priority under 35 USC § 119 of French Patent Application No. 17 00456 filed on Apr. 26, 2017.

FIELD OF THE INVENTION

The present invention relates to a method of visualization of the traffic around a reference aircraft in a compliant display zone.

The present invention also relates to an associated computer program product and visualization system.

BACKGROUND OF THE INVENTION

Different systems already exist in the state of the art for visualizing the state of traffic around an aircraft.

Thus, for example, the traffic alert and collision avoidance system (TCAS) proposes a two-dimensional graphic representation of the surrounding aircraft based on their horizontal distance from the given aircraft.

In particular, in such a representation, each surrounding aircraft is represented by a symbol placed on a ray coming from a symbol representing the given aircraft, proportionally to the horizontal distance separating these aircraft.

The visualization of each symbol is accompanied by information relative to the altitude of the corresponding surrounding aircraft. Furthermore, the color and shape of such a symbol indicate potential conflicts of the given aircraft with the corresponding surrounding aircraft.

A visualization system is also known, called head-up display, that makes it possible to project the three-dimensional position of each aircraft on a transparent surface placed in front of the pilot.

Each surrounding aircraft is shown on such a surface in the form of a graphic representation that is then placed on the pilot's vision axis toward this surrounding aircraft.

This type of display is known in the state of the art as "compliant" because it is placed on the actual position aircraft and thus makes it possible to display information from the actual landscape. To do so, it depends directly on the position of the aircraft, the altitude of the aircraft and the orientation of the pilot's vision axis.

Contrary to the term "compliant", the display type of the aforementioned TCAS system is known in the state of the art as "noncompliant". In particular, this type of display depends on the speed vector of the aircraft and does not change with the changes in altitude thereof.

However, the use of one or the other of the aforementioned visualization systems, and even two systems at the same time, does not allow the pilot to see the evolution dynamics of the surrounding aircraft, and in particular their speed, movement direction and proximity.

SUMMARY OF THE INVENTION

The present invention aims to improve the pilot's perception of the evolution dynamics of the state of traffic.

To that end, the invention relates to a method of visualization of the traffic around a reference aircraft moving near a plurality of surrounding aircraft.

The method includes the following steps carried out for each surrounding aircraft:

A) acquiring the actual position of the surrounding aircraft in the airspace;

B) delimiting part of the airspace around the acquired actual position by a current three-dimensional contour;

C) visualizing the current three-dimensional contour in a compliant display zone of the reference aircraft;

D) tracking the actual position of the surrounding aircraft, and when this position is outside the current three-dimensional contour:

delimiting part of the airspace around the actual position of the surrounding aircraft by a new current three-dimensional contour, henceforth called current three-dimensional contour, the former current three-dimensional contour henceforth being called previous three-dimensional contour;

visualizing the current three-dimensional contour in the compliant display zone of the reference aircraft.

According to other advantageous aspects of the invention, the method comprises one or more of the following features, considered alone or according to all technically possible combinations:

step D) further comprises visualizing a history of the current three-dimensional contour comprising N consecutive previous three-dimensional contours;

the number N is predetermined and preferably equal to 2;

each three-dimensional contour is visualized by a three-dimensional symbol, the three-dimensional symbol corresponding to the current three-dimensional contour comprising a characteristic distinguishing it from each three-dimensional symbol corresponding to a previous three-dimensional contour;

said characteristic is a predetermined color;

each three-dimensional contour is visualized by a three-dimensional symbol having the same shape as the corresponding three-dimensional contour;

all of the three-dimensional contours have a same shape and have the same dimensions in the space surrounding the actual environment;

each three-dimensional contour is in the shape of a parallelepiped, preferably a cube;

each three-dimensional contour comprises at least one face arranged parallel to the horizontal plane defined relative to the earth's surface; and each three-dimensional contour is oriented along a fixed land coordinate system;

the traffic state display is a head-up display.

The invention also relates to a computer program product including software instructions which, when implemented by computer equipment, carry out a method as defined above.

The invention also relates to a system of visualization of the traffic around a reference aircraft moving near a plurality of surrounding aircraft.

The system includes an acquisition module configured to acquire the actual position of the surrounding aircraft in the airspace; a processing module configured to delimit a part of the airspace around the acquired actual position by a current three-dimensional contour; a visualization module configured to visualize the current three-dimensional contour in a compliant display zone of the reference aircraft.

The acquisition module is further configured to track the actual position of the surrounding aircraft, and when this position is outside the current three-dimensional contour:

the processing module is further configured to delimit a part of the airspace around the actual position of the surrounding aircraft by a new current three-dimensional contour, henceforth called current three-dimensional contour, the former current three-dimensional contour henceforth being called previous three-dimensional contour; and the visualization module is further configured to visualize the current three-dimensional contour in the compliant display zone of the reference aircraft.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION

Figure 1:
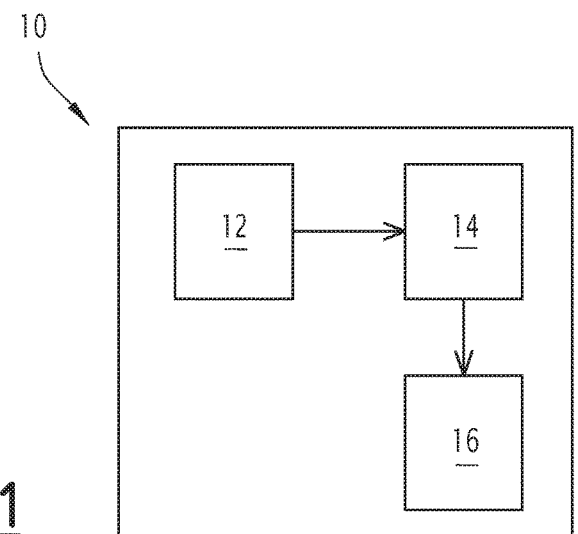
FIG. 1 is a schematic illustration of a visualization system according to the invention.

The visualization system 10 of FIG. 1 is on board an aircraft, hereinafter called reference aircraft, and makes it possible to visualize the state of traffic around this reference aircraft.

Reference aircraft here refers to any airplane or helicopter or any other flying vehicle able to be piloted by a pilot from this vehicle.

According to another example embodiment, the reference aircraft is a drone able to be piloted remotely. In this case, the visualization system 10 is arranged in a control center, for example on land, from which the drone is piloted.

In reference to this FIG. 1, the visualization system 10 comprises an acquisition module 12, a processing module 14 and a visualization module 16.

The acquisition module 12 is for example an electronic module making it possible to acquire positions of aircraft located near the reference aircraft. These aircraft are subsequently called surrounding aircraft.

Like in the case of the reference aircraft, surrounding aircraft refers to any airplane or helicopter or any other flying vehicle, such as a drone, for example.

In particular, the acquisition module 12 is able to acquire actual positions of surrounding aircraft located at a distance smaller than a predetermined maximum distance, from the reference aircraft. The predetermined maximum distance is for example equal to 20 NM or to the distance corresponding to 3 minutes of flight from the reference aircraft.

These positions are provided by on board systems known in themselves, for example the traffic alert and collision avoidance system (TCAS), the surveillance system of the ADS-B (Automatic Dependent Surveillance-Broadcast) type or the radar.

Each acquired position is for example a relative position of the surrounding aircraft, i.e., a determined position relative to the reference aircraft, or an absolute position of the surrounding aircraft, i.e., a determined position relative to a fixed geographic coordinate system (typically a latitude, longitude, altitude). Each acquired position thus assumes the form of at least three coordinates.

The processing module 14 is for example a computer able to implement software making it possible to control the visualization module 16 to visualize the state of traffic around the reference aircraft, from positions acquired by the acquisition module 12, as will be explained hereinafter.

The visualization module 16 is able to carry out a traffic state display 20 from commands given by the processing module 14.

In particular, according to the described example, the visualization module 16 assumes the form of a head-up viewer, which may be equipment generally known under the acronym HUD (Head-Up Display) or equipment known under the acronym HMD (Helmet Mounted Display) or any other solution making it possible to display information superimposed on the actual landscape.

To that end, the visualization module 16 comprises a display surface and projection means projecting, on the display surface, rays of light to display the necessary information. The display surface is for example arranged on the pilot's vision axis outside the reference aircraft and advantageously has the windshield or at least part of the windshield of the cockpit of the reference aircraft. Alternatively, the display surface assumes the form of an at least partially transparent screen arranged in front of the pilot or a helmet worn by the pilot.

According to another example embodiment, the visualization module 16 assumes the form of a head-down display. In this case, the visualization module 16 is arranged below the pilot's vision axis outside the aircraft and in particular comprises a display screen known in itself that is for example associated with a viewer of the SVS (Synthetic Vision System) type. This type of viewer makes it possible to depict a synthetic scene, representative of reality. Thus, principle of compliant representation of the traffic can be applied to a scene of the SVS type, and therefore be compliant in the SVS-type scene (and no longer in the landscape).

Figure 3:
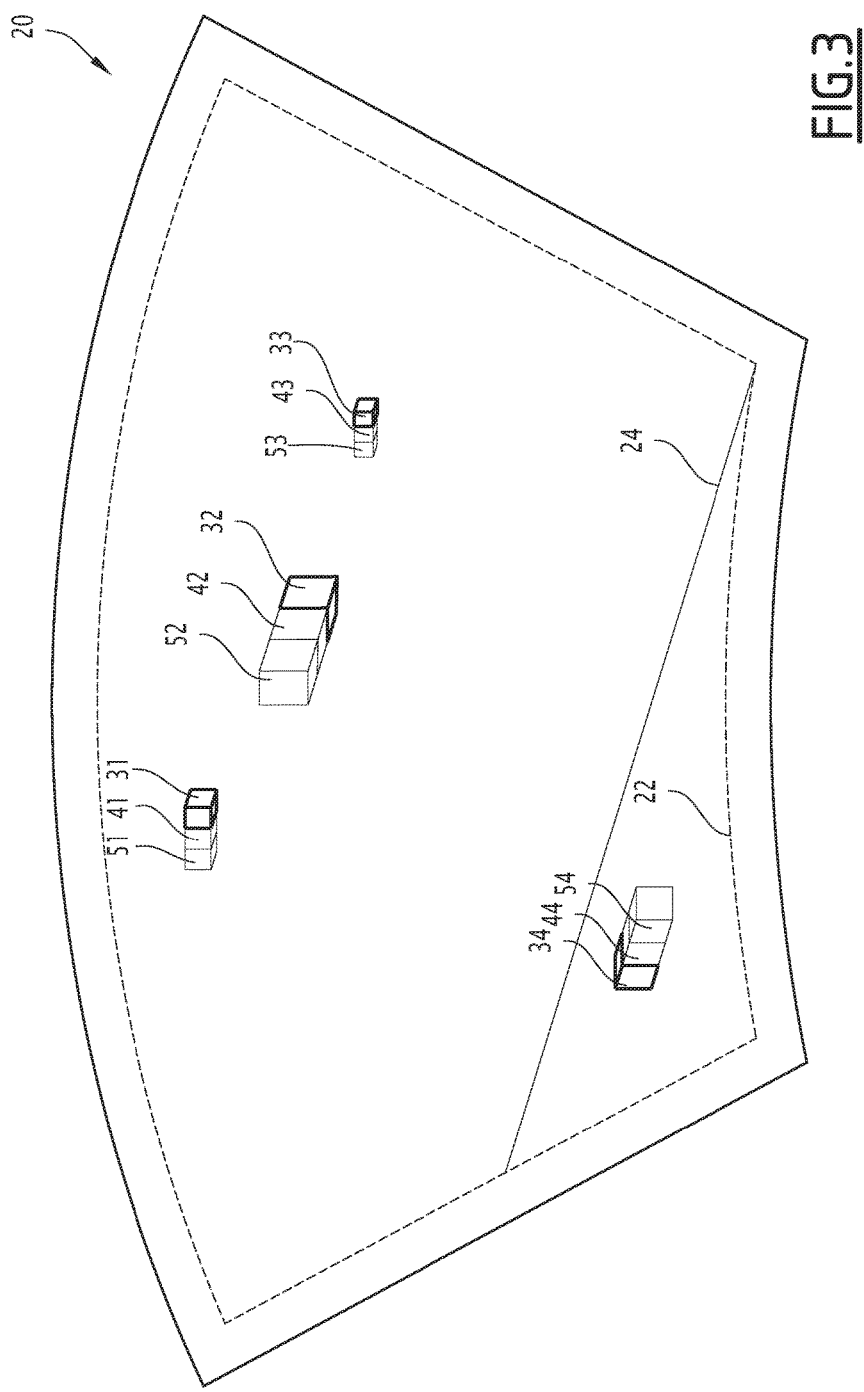
FIG. 3 is a schematic view illustrating the implementation of the method of FIG. 2.

The traffic state display 20 is illustrated in more detail in FIG. 3.

Thus, in reference to this FIG. 3, the traffic state display 20 comprises a compliant display zone 22.

The compliant display zone 22 makes it possible to view the positions of the surrounding aircraft by projecting these positions on the corresponding display surface or on the corresponding display screen, superimposed with the actual landscape. This type of display is therefore dependent on the current altitude of the reference aircraft. The actual landscape in particular comprises a horizon line 24, which, in the example of FIG. 3, is slightly tilted. This horizon line 24 then presents said horizontal plane.

When the visualization module 16 assumes the form of a head-down viewer, the compliant display zone 22 is built according to pseudo-compliance principles according to methods known in themselves. This in particular means that the compliant display zone 22 has an augmented reality relative to a viewer known as "noncompliant", for example the viewer of the TCAS system.

Figure 2:
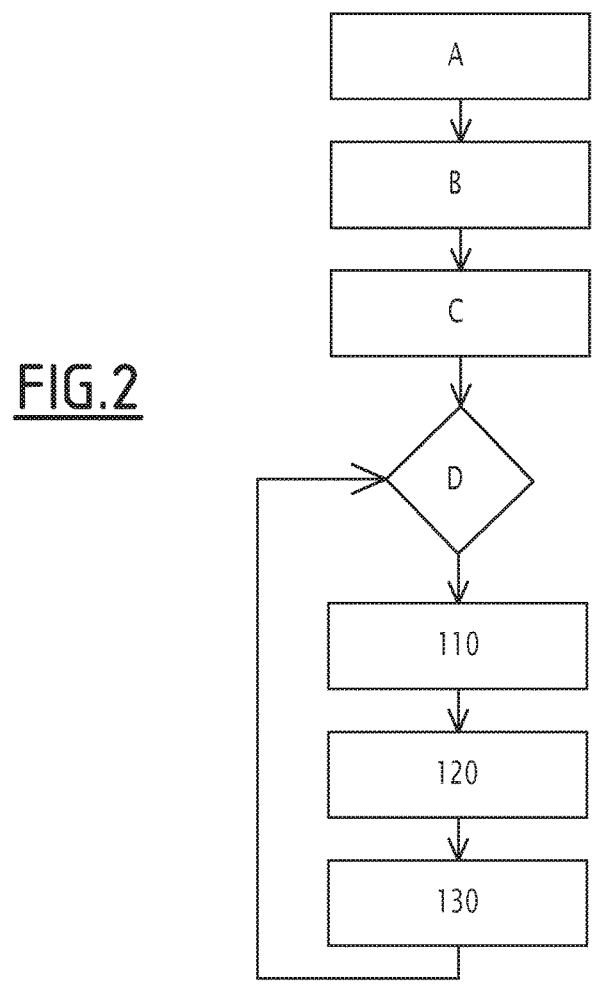
FIG. 2 is a flowchart of a visualization method according to the invention, the method being carried out by the visualization system of FIG. 1.

The visualization method according to the invention makes it possible to implement the display in the compliant display zone 22 and will henceforth be explained in reference to FIG. 2, showing a flow chart of its steps.

The steps of this method will be explained in reference to a single surrounding aircraft. It is clear that these steps can be reiterated similarly for each of the other surrounding aircraft.

The initial step A) of this method is carried out when the position of the surrounding aircraft becomes detectable by the corresponding systems of the reference aircraft or when the distance between the two aircraft drops below a predetermined threshold.

In particular, during this step A), the acquisition module 12 acquires the actual position of the surrounding aircraft. As previously mentioned, this actual position is, for example, made up of three coordinates.

Then, the acquisition module 12 sends this acquired position to the processing module 14.

During the following step B), the processing module 14 delimits part of the airspace around the acquired actual position, and in particular around the surrounding aircraft, by a current three-dimensional contour.

This current three-dimensional contour then has a virtual geometric shape in the airspace.

This shape has fixed spatial dimensions and is oriented in a fixed land coordinate system. These dimensions and this orientation are therefore independent of the reference aircraft and the surrounding aircraft. In particular, according to the preferred embodiment, these dimensions and this orientation remain the same for all of the surrounding aircraft.

The current three-dimensional contour comprises at least one face arranged parallel to the horizontal plane, i.e., plane of the artificial horizon, defined relative to the Earth's surface.

In the described example, the current three-dimensional contour is in the shape of a parallelepiped, preferably a cube.

According to this example, the cube is arranged in the airspace such that one of its faces is parallel to the horizontal plane and two perpendicular faces adjacent to this face are arranged along perpendicular axes of the fixed land coordinate system.

The side of this cube is for example equal to 300 meters.

During the following step C), the processing module 14 commands the visualization module 16 to visualize the current three-dimensional contour in the compliant display zone 22 of the reference aircraft.

Thus, during this step, the current three-dimensional contour is visualized in the compliant display zone 22 for example by a three-dimensional symbol having the same shape as the corresponding three-dimensional contour.

The dimensions of this three-dimensional symbol in the compliant display zone 22 are determined based on the proportions of this display zone 22 relative to the surrounding airspace.

Thus, for example, when the current three-dimensional contour assumes the form of a cube, the corresponding three-dimensional symbol visualized in the compliant display zone 22 assumes the form of a cube whose dimensions are reduced in proportion to the distance separating the reference aircraft from the surrounding aircraft.

During the following step D), the acquisition module 12 acquires each new actual position of the surrounding aircraft and sends this position to the processing module 14 for analysis.

During the same step D), the processing module 14 analyzes the actual position most recently acquired, and when this position is outside the current three-dimensional contour, carries out the following steps 110 to 130.

Step 110 is similar to step B) previously described.

In particular, during this step 110, the processing module 14 delimits part of the airspace around the actual position of the surrounding aircraft, and in particular around the surrounding aircraft, by a new current three-dimensional contour, henceforth called current three-dimensional contour.

The former current three-dimensional contour will then be referred to as the "previous three-dimensional contour".

The current three-dimensional contour is similar to the previous three-dimensional contour.

More particularly, the current three-dimensional contour has the same shape as the previous three-dimensional contour, and has the same dimensions and orientation as the latter.

Thus, the current three-dimensional contour differs from the previous three-dimensional contour only by its position in space.

The current three-dimensional contour is for example adjacent to the previous three-dimensional contour.

During the following step 120, the processing module 14 commands the visualization module 16 to visualize the current three-dimensional contour in the compliant display zone 22 of the reference aircraft.

Like during step C), during step 120, the three-dimensional contour is visualized by a three-dimensional symbol having the same shape as this contour.

Like in the previous case, the dimensions of this three-dimensional symbol in the compliant display zone 22 are determined based on the proportions of this display zone 22 relative to the surrounding airspace.

Based on the configuration of the update of the compliant display zone 22, step 120 may further comprise erasing the corresponding three-dimensional symbol from the previous three-dimensional contour.

During the following step 130, the processing module 14 commands the visualization module 16 to visualize a history of the current three-dimensional contour in the compliant display zone 22 of the reference aircraft.

In particular, the history comprises N consecutive previous three-dimensional contours.

The number N is for example greater than or equal to 1, and preferably equal to 2.

Like during the previous step, each of these previous three-dimensional contours is visualized by a three-dimensional symbol having the same shape as this contour.

The dimensions of each of the three-dimensional symbols in the compliant display zone 22 are determined based on the proportions of this display zone 22 relative to the surrounding airspace.

Thus, the three-dimensional symbols corresponding to different three-dimensional contours differ from one another by their positions in the display zone 22, and optionally by their dimensions.

Furthermore, according to the described example, the three-dimensional symbols corresponding to the three-dimensional contours of the history of the current three-dimensional contour comprise a characteristic distinguishing them from the three-dimensional symbol corresponding to the current three-dimensional contour.

This characteristic is for example the color.

Thus, for example, the symbol corresponding to the current three-dimensional contour is visualized in dark yellow, while the other symbols are in light red.

At the end of step 130, the processing module 14 again carries out step D) until the position of the surrounding aircraft remains detectable by the corresponding systems of the reference aircraft or until the distance between the two aircraft drops below a predetermined threshold.

FIG. 3 illustrates a result of the application of the method according to the invention to the four surrounding aircraft.

Indeed, in this FIG. 3, four three-dimensional symbols 31 to 34 corresponding to current three-dimensional contours of different surrounding aircraft are illustrated. This in particular means that, at the moment illustrated in FIG. 3, each of these aircraft is in the three-dimensional contour associated with one of the three-dimensional symbols 31 to 34.

The symbols 31 to 34 assume the form of cubes with different dimensions. Given that the symbols 31 to 34 correspond to the three-dimensional contours with the same dimensions, it is clear that the surrounding aircraft are located at different distances relative to the reference aircraft.

Furthermore, a history is associated with each of the symbols 31 to 34.

This history comprises two other symbols for each of the symbols 31 to 34. In FIG. 3, the symbols adjacent to the symbols 31 to 34 are respectively designated by references 41 to 44 and the symbols adjacent to the symbols 41 to 44 are respectively designated by references 51 to 54.

The symbols 41 to 44 then correspond to previous three-dimensional contours in which the surrounding aircraft were found just before entering the current three-dimensional contours.

Similarly, the symbols 51 to 54 correspond to previous three-dimensional contours in which the surrounding aircraft were found just before entering the previous three-dimensional contours corresponding to the symbols 41 to 44.

In the example embodiment of FIG. 3, the symbols 31 to 34 are visualized by a darker color than the other symbols.

Lastly, it is clear that if, during a next iteration of the method, one of the surrounding aircraft leaves its current three-dimensional contour, a new current three-dimensional contour will then be associated with this aircraft and a new symbol corresponding to this current three-dimensional contour will be visualized in the compliant display zone 22.

One can see that the present invention has a certain number of advantages.

First, the method according to the invention provides a visualization of a state of traffic around a reference aircraft allowing the pilot to best perceive the evolution dynamics of the traffic.

Indeed, the representation of each of the surrounding aircraft by three-dimensional symbols corresponding to three-dimensional contours with the same dimensions and fixed in space, makes it easy to estimate the relative positions of the surrounding aircraft relative to the reference aircraft.

Furthermore, the history associated with each of the symbols allows the pilot to estimate the evolution dynamics of the corresponding surrounding aircraft quickly. In particular, using the history, it becomes particularly simple and intuitive to perceive whether the corresponding surrounding aircraft is getting closer or further away, ascending or descending, advancing with a high or low speed, etc.

Of course, other example embodiments of the invention are also possible.

In particular, in the described example, the orientation of the three-dimensional contours is fixed. It is, however, possible to consider that this orientation is defined based on the speed vector of the surrounding aircraft or based on other surrounding aspects.

It is also possible to visualize a certain quantity of additional information next to and/or inside the three-dimensional symbols. This information may for example comprise the speed vector of the corresponding surrounding aircraft, its past trajectory, a prediction of its future trajectory and specific symbols when the approach of the surrounding aircraft becomes dangerous.

The invention claimed is:

1. A method of visualization of the traffic around a reference aircraft moving near a plurality of surrounding aircraft, comprising the following steps carried out for each surrounding aircraft:
   A) acquiring the actual position of the surrounding aircraft in the airspace;
   B) delimiting part of the airspace around the acquired actual position by a current three-dimensional contour;
   C) visualizing the current three-dimensional contour in a compliant display zone of the reference aircraft; and
   D) tracking the actual position of the surrounding aircraft, and when this position is outside the current three-dimensional contour:
      delimiting part of the airspace around the actual position of the surrounding aircraft by a new current three-dimensional contour, henceforth called current three-dimensional contour, the former current three-dimensional contour henceforth being called previous three-dimensional contour; and
      visualizing the current three-dimensional contour in the compliant display zone of the reference aircraft.

2. The method according to claim 1, wherein step D) further comprises visualizing a history of the current three-dimensional contour comprising N consecutive previous three-dimensional contours.

3. The method according to claim 2, wherein the number N is predetermined.

4. The method according to claim 3, wherein the number N is equal to 2.

5. The method according to claim 3, wherein each three-dimensional contour is visualized by a three-dimensional symbol, the three-dimensional symbol corresponding to the current three-dimensional contour comprising a characteristic distinguishing it from each three-dimensional symbol corresponding to a previous three-dimensional contour.

6. The method according to claim 5, wherein said characteristic is a predetermined color.

7. The method according to claim 1, wherein each three-dimensional contour is visualized by a three-dimensional symbol having the same shape as the corresponding three-dimensional contour.

8. The method according to claim 1, wherein all of the three-dimensional contours have a same shape and have the same dimensions in the space surrounding the actual environment.

9. The method according to claim 1, wherein each three-dimensional contour is in the shape of a parallelepiped.

10. The method according to claim 9, wherein each three-dimensional contour is a cube.

11. The method according to claim 1, wherein each three-dimensional contour comprises at least one face arranged parallel to the horizontal plane defined relative to the earth's surface.

12. The method according to claim 1, wherein each three-dimensional contour is oriented along a fixed land coordinate system.

13. The method according to claim 1, wherein the traffic state display is a head-up display.

14. A computer program product comprising software instructions which, when implemented by a piece of computer equipment, carry out the method according to claim 1.

15. A system of visualization of the traffic around a reference aircraft moving near a plurality of surrounding aircraft, the system comprising:
   an acquisition module configured to acquire the actual position of the surrounding aircraft in the airspace;

a processing module configured to delimit part of the airspace around the acquired actual position by a current three-dimensional contour; and a visualization module configured to visualize the current three-dimensional contour in a compliant display zone of the reference aircraft, the acquisition module further being configured to track the actual position of the surrounding aircraft, and when this position is outside the current three-dimensional contour:

the processing module is further configured to delimit a part of the airspace around the actual position of the surrounding aircraft by a new current three-dimensional contour, henceforth called current three-dimensional contour, the former current three-dimensional contour henceforth being called previous three-dimensional contour; and the visualization module is further configured to visualize the current three-dimensional contour in the compliant display zone of the reference aircraft.

* * * * *